US007788727B2

(12) United States Patent
Shintani

(10) Patent No.: US 7,788,727 B2
(45) Date of Patent: Aug. 31, 2010

(54) SYSTEM AND METHOD FOR PIGGYBACKING ON INTERFACE LICENSE

(75) Inventor: Peter Shintani, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 992 days.

(21) Appl. No.: 11/580,781

(22) Filed: Oct. 13, 2006

(65) Prior Publication Data

US 2008/0092246 A1   Apr. 17, 2008

(51) Int. Cl.
*G06F 17/30* (2006.01)
(52) U.S. Cl. .......................................... 726/26; 726/30
(58) Field of Classification Search .................. 726/26, 726/30; 380/200
See application file for complete search history.

(56) References Cited

U.S. PATENT DOCUMENTS

| 5,222,133 A | 6/1993 | Chou et al. ..................... 380/4 |
| 7,103,574 B1 * | 9/2006 | Peinado et al. ................. 705/51 |
| 7,190,792 B2 * | 3/2007 | Shamoon ..................... 380/232 |
| 7,233,666 B2 * | 6/2007 | Lee et al. ....................... 380/46 |
| 7,239,706 B1 * | 7/2007 | Wilhelm et al. ............. 380/240 |
| 7,305,711 B2 * | 12/2007 | Ellison et al. ................. 726/29 |
| 2001/0056545 A1 * | 12/2001 | Takechi et al. .............. 713/200 |
| 2005/0027994 A1 * | 2/2005 | Sai .............................. 713/189 |
| 2005/0069130 A1 | 3/2005 | Kobayashi |
| 2006/0120532 A1 | 6/2006 | Kean et al. |

FOREIGN PATENT DOCUMENTS

| WO | WO 01/41039 A2 | 6/2001 |
| WO | WO0141039 A2 | 6/2001 |

* cited by examiner

*Primary Examiner*—Minh Dieu Nguyen
(74) *Attorney, Agent, or Firm*—John L. Rogitz

(57) ABSTRACT

Prior to using a HDCP KSV for HDMI-based encryption authentication, the KSV from the source is examined to determine whether it is in a list of KSVs that have been pre-approved by the sink vendor, to further restrict access to the interface of the sink to only those HDCP-compliant sources that have been approved by the sink vendor.

12 Claims, 2 Drawing Sheets

SYSTEM AND METHOD FOR PIGGYBACKING ON INTERFACE LICENSE

FIELD OF THE INVENTION

The present invention relates generally to systems and methods for securing interfaces between multimedia sources and sinks.

BACKGROUND OF THE INVENTION

In the television field, High Definition Multimedia Interface (HDMI), which is the successor to Digital Visual Interface (DVI) for video presentation, is an interface that allows full uncompressed audio and video to be transmitted from a multimedia source, such as a disk player or set top box (STB), to a sink device such as a TV over a single line. HDMI may be used in conjunction with High Definition Content Protection (HDCP), which is a security feature for preventing unauthorized hardware from connecting to authorized hardware and for transferring protected and encrypted data over a non-secure medium. In essence, HDCP uses a key exchange, and if a satisfactory key exchange is not effected, a multimedia stream provided by a source such as a set-top box or DVD player cannot be played on a sink such as a TV.

As recognized herein, to use HDCP, a vendor of a sink device must obtain from an interface licensor the necessary encryption key information, referred to in HDCP parlance as a "key select vector" or "KSV". As also recognized herein, this existing licensing regime may be used to further protect and promote the licensing of an interface.

SUMMARY OF THE INVENTION

A method is disclosed for enabling a sink device provided by a sink vendor to play multimedia from a source only if the source presents to the sink device encryption information obtained from a licensor that is independent of the sink vendor and that is in a data structure of encryption information generated by the sink vendor.

In non-limiting implementations the sink device may include an associated High Definition Multimedia Interface (HDMI). The encryption information may include, e.g., a High Definition Content Protection (HDCP) key selection vector (KSV) or a digital transmission content protection (DTCP) certificate. If desired, the data structure can be partitioned by source vendor identification.

Nothing need be encrypted or decrypted in determining whether the encryption information from the source is present in the data structure. However, if desired encryption-based authentication may also be undertaken using the encryption information before or after determining whether the encryption information from the source is present in the data structure.

In another aspect, a sink device system includes a sink including a video display for displaying multimedia received from a source and an interface for receiving multimedia from the source for playing thereof on the video display. Playing of multimedia is pending satisfaction of the source presenting to the sink encryption information, obtained from a licensor independent of a vendor of the interface, that is determined by the sink to be present in a data structure of encryption information generated by the vendor of the interface.

In yet another aspect, a source of multimedia is configured to comply with an industry-wide encryption protocol, and a sink likewise is configured to comply with an industry-wide encryption protocol to play multimedia. Logic is provided for allowing the sink to play multimedia from the source only if (1) the industry-wide encryption protocol is satisfied between the source and sink, and (2) the source and/or the sink has been approved by the vendor of the other of the sink and/or the source.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

The present invention is directed to piggybacking on an existing interface restriction, such as the restrictions imposed by HDMI and/or HDCP (i.e., that only source devices with licensed KSVs can communicate with sink devices that also must have licensed KSVs.) The present invention does this by further restricting access to a vendor module (for example, a sink module) that might incorporate HDMI/HDCP to only those subcontractor source units that possess KSVs that have been placed on a list approved by the sink vendor. The invention, however, is not limited to HDMI/HDCP but can also be used with other interfaces. For example, the invention can be used with a vendor module incorporating a IEEE-1394 interface, in which case the encryption information discussed below can include a digital transmission content protection (DTCP) certificate.

While the disclosure below assumes a sink vendor that wishes to restrict access to a sink module to only multimedia source devices from vendor-approved partner companies, also referred to herein as "subcontractors", it is to be understood that the inverse can also be true, i.e., that a source vendor can use present principles to restrict access to a source module to only sinks from approved subcontractors.

Figure 1:
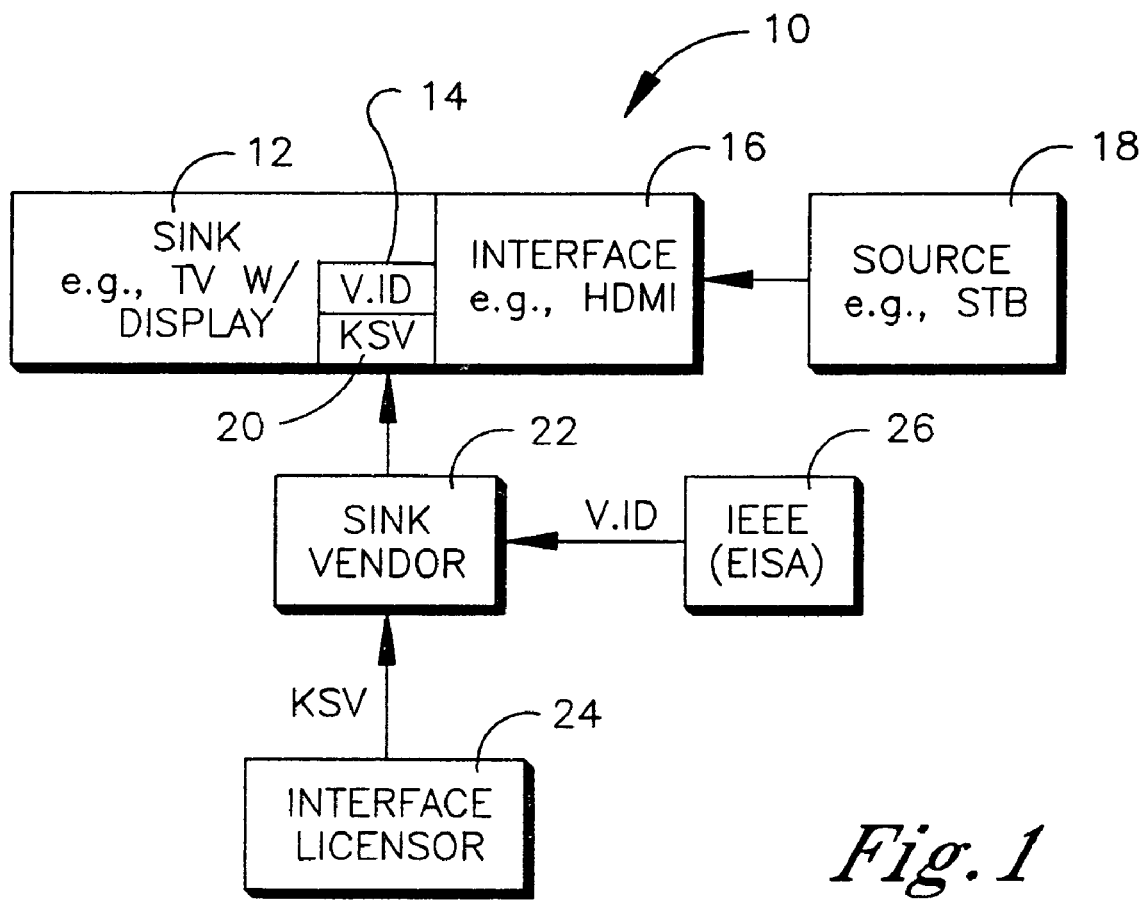
FIG. 1 is a block diagram of a non-limiting system of the present invention.

Referring initially to FIG. 1, a system is shown, generally designated 10, which includes a multimedia sink device 12 such as a television that typically includes a video display, processor, and TV tuner. The sink device 12 also has data storage 14 such as but not limited to an extended display identification data (EDID) electrically erasable programmable read only memory (EEPROM) that can store one or more of the below-described information elements.

The sink device 12 is also associated with a communication interface 16. In one non-limiting implementation the interface 16, which can be an Internet Protocol television (IPTV) receiver, codec, or other module, is a HDMI-based interface that may include hardware and software embodying a HDMI transmitter (for sending signals to a multimedia source 18 such as but not limited to a set-top box or disk player) and HDMI receiver (for receiving signals from the source 18). The interface 16 may be physically implemented within the housing of the sink device 12 or it may be external thereto. The interface 16 may include a storage 20 such as an EEPROM or one-time programming (OTP) ROM. It is to be understood that while FIG. 1 shows various storages, the information disclosed below may be stored in one common storage or in a storage associated with only the sink device 12 or only with the interface 16. In any case, the interface 16 is the communication interface between the sink device 12 and source 18.

FIG. 1 schematically indicates that the sink device 12 is provided by a sink vendor 22. Among other things, the sink vendor 22 can supply the sink device 12 with encryption information in accordance with the logic discussed below. This encryption information, which may originate from an interface licensor 24, can include device-unique encryption information as well as a list of authorized source encryption information as further discussed below. In one non-limiting implementation, when the interface 16 is an HDMI interface, the sink device-unique encryption information can be a High Definition Content Protection (HDCP) key selection vector (KSV), and if desired the KSV may be stored in the interface storage 20. Essentially, the KSV can be regarded as a public key that is used for authentication. The list may also be a list of KSVs of authorized source devices.

Additionally, FIG. 1 schematically indicates that a vendor ID authority 26 may communicate with the sink vendor 22 to supply vendor-unique vendor ID to the sink vendor 22. A list of authorized vendor IDs in turn can be stored, in some non-limiting implementations, in the sink storage 14. As but one example, the vendor ID authority may be an extended industry standard architecture (EISA) authority who can supply vendors with three byte Institute of Electrical and Electronic Engineers (IEEE) vendor IDs.

Figure 2:
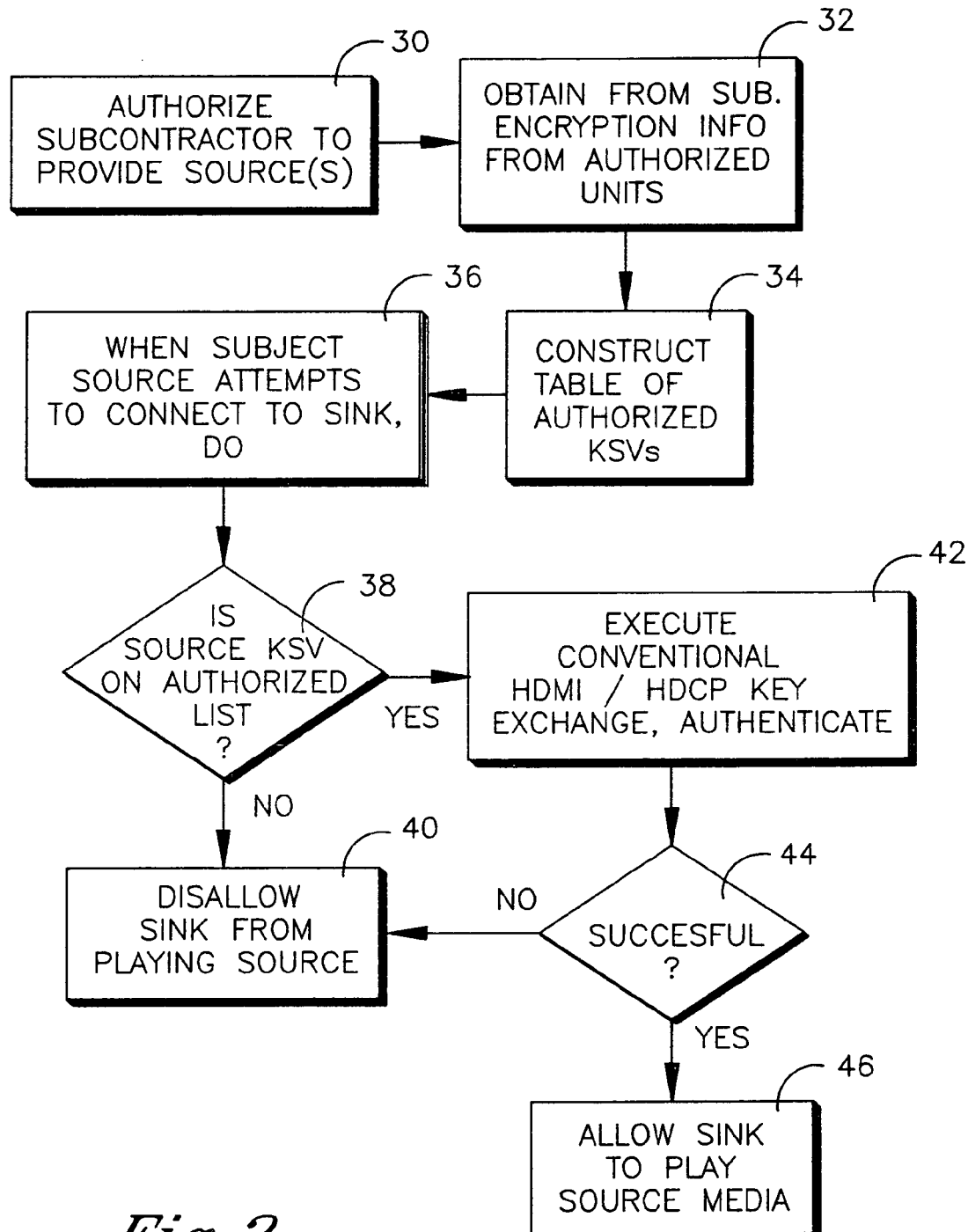
FIG. 2 is a flow chart of non-limiting logic in accordance with present principles.

With the above in mind, reference is now made to FIG. 2. Commencing at block 30, the vendor of the sink 12 authorizes partner companies, also referred to herein as "subcontractors", to provide sources 18 of multimedia. At block 32, the sink vendor obtains from each approved subcontractor encryption information such as HDCP KSVs for each source device the subcontractor would like to have approved for operation with the sinks of the vendor. Proceeding to block 34, the sink vendor constructs a data structure such as but not limited to a table of encryption information associated with approved source devices, e.g., a table of the KSVs of the source devices 18 that the subcontractor would like to be operable with the vendor's sink devices 12. If desired, the data structure can be partitioned by vendor ID (equivalently, separate data structures can be provided for each vendor ID). Of course, the sink vendor may also be a provider of multimedia sources, in which case the encryption information associated with the sources that are provided by the sink vendor are also entered into the approved device data structure.

Block 36 indicates that subsequent to vendor approval of subcontractor sources 18, when a vendor sink 12 is sold to a consumer and the consumer attempts to connect a source 18 to it, apart from any conventional use of the encryption information, e.g., apart from using HDCP KSVs for key exchange/authentication/etc. in accordance with HDCP principles known in the art (or equivalently apart from using DTCP certificates for authentication), the logic, now executed by the processor of the sink device 12, proceeds to decision diamond 38 to determine whether the KSV (or other encryption information) presented by the source is in the data structure of approved source information that was compiled at block 34. In this regard, the data structure may be provided to each vendor sink 12 and stored in, e.g., the sink storage 14 and/or interface storage 20. Or, the sink device processor may access a server database on the Internet which stores the data structure. If desired, the source also provides its associated vendor ID so that the search of the data structure, which can be partitioned by vendor ID, can be executed more quickly.

If the encryption information presented by the source 18 is not in the data structure of approved encryption information, the sink device 12 moves to block 40 to disallow playing of multimedia from the source 18. In essence, this portion of the logic is not encryption-based authentication since nothing is encrypted/decrypted; instead, the information necessary for encrypting/decrypting is merely examined to determine whether it is in the data structure of approved encryption information, without yet using it for encryption/decryption. Thus, the process can end even before conventional encryption-based authentication protocol is performed.

On the other hand, if the encryption information presented by the source 18 is in the data structure of approved encryption information, the sink device 12 moves to block 42 to execute the encryption-based authentication protocol, which can include conventional HDCP key exchange, authentication, etc. If the encryption-based authentication protocol succeeds at decision diamond 44, the sink is allowed to play multimedia from the source at block 46; otherwise, playing of multimedia is disallowed at block 40.

In some instances, the interface might not be operated with conventional encryption (e.g., HDCP) activated. In these cases, the logic need not include block 42 and decision diamond 44, with a positive test result at decision diamond 38 resulting in the logic immediately flowing to block 46.

While the particular SYSTEM AND METHOD FOR PIGGYBACKING ON INTERFACE LICENSE is herein shown and described in detail, it is to be understood that the subject matter which is encompassed by the present invention is limited only by the claims.

What is claimed is:

1. A method comprising:
   enabling a sink device provided by a sink vendor to play multimedia from a source only if:
   the source presents to the sink device encryption information obtained from a licensor that is independent of the sink vendor and that is in a previously compiled data structure of encryption information generated by the sink vendor, wherein the sink device compares the encryption information to multiple entries of encryption information in the data structure and permits subsequent use of the encryption information to decrypt content from the source only if the encryption information is first determined to match an entry in the data structure, wherein nothing is encrypted or decrypted in determining whether the encryption information from the source is present in the data structure, wherein encryption-based authentication is undertaken using the encryption information before or after determining whether the encryption information from the source is present in the data structure.

2. The method of claim 1, wherein a sink device includes an associated High Definition Multimedia Interface (HDMI).

3. The method of claim 1, wherein the encryption information includes a High Definition Content Protection (HDCP) key selection vector (KSV).

4. The method of claim 1, wherein the encryption information includes a digital transmission content protection (DTCP) certificate.

5. The method of claim 1, wherein the data structure is partitioned by source vendor identification.

6. The method of claim 1, wherein the sink device system includes a TV.

7. A sink device system comprising:
   a sink including a video display for displaying multimedia received from a source and an interface for receiving multimedia from the source for playing thereof on the video display pending satisfaction of:
   the source presenting to the sink encryption information, obtained from a licensor independent of a vendor of the interface, that is determined by the sink to be present in a data structure of encryption information generated by the vendor of the interface, wherein nothing is encrypted or decrypted in determining whether the encryption information from the source is present in the data structure, wherein encryption-based authentication is undertaken using the encryption information before or after determining whether the encryption information from the source is present in the data structure.

8. The system of claim 7, wherein a sink includes a High Definition Multimedia Interface (HDMI).

9. The system of claim 7, wherein the encryption information includes a High Definition Content Protection (HDCP) key selection vector (KSV).

10. The system of claim 7, wherein the encryption information includes a digital transmission content protection (DTCP) certificate.

11. The system of claim 7, wherein the data structure is partitioned by source vendor identification.

12. The system of claim 7, wherein the sink includes a TV.

* * * * *